May 25, 1943.  K. BRENKERT  2,320,064
OIL-RELIEVED GENEVA MOVEMENT
Filed Aug. 7, 1941
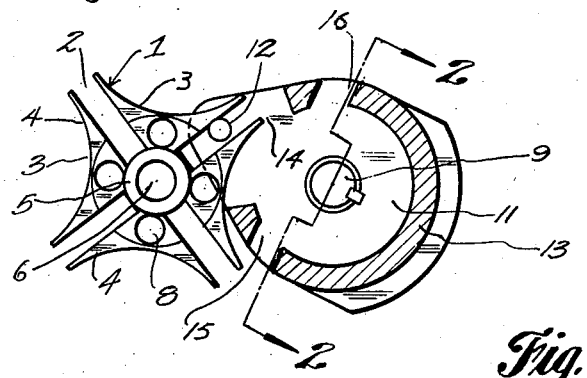
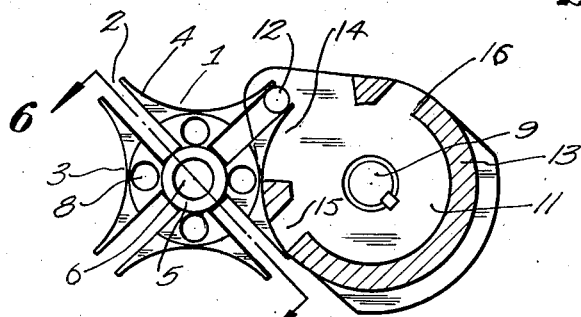
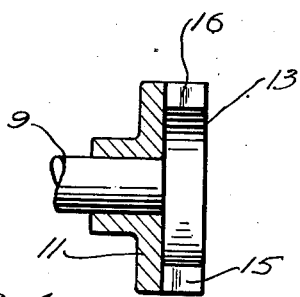
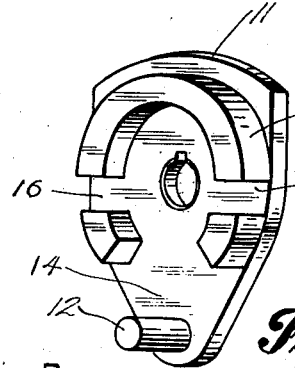
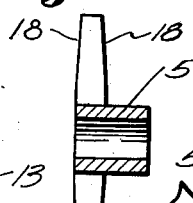
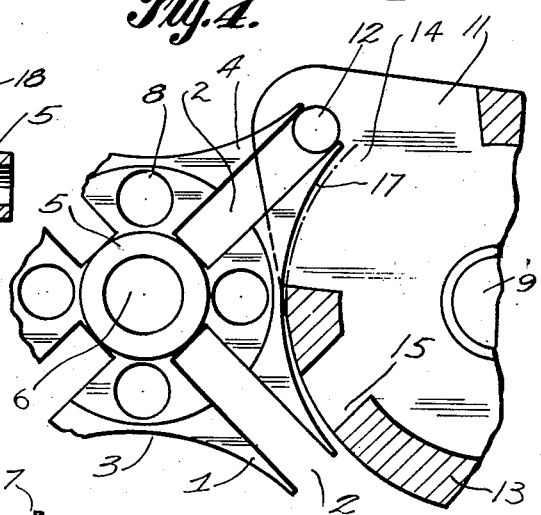
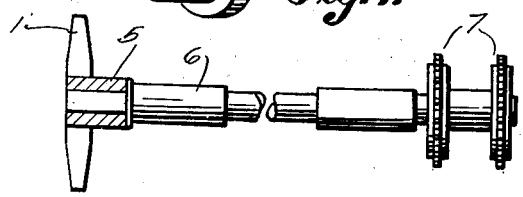
INVENTOR.
KARL BRENKERT.
BY Samuel Weisman Patented May 25, 1943.

2,320,064

UNITED STATES PATENT OFFICE 2,320,064

OIL-RELIEVED GENEVA MOVEMENT

Karl Brenkert, Detroit, Mich., assignor to Brenkert Light Projection Company, Detroit, Mich.

Application August 7, 1941, Serial No. 405,776

5 Claims. (Cl. 74—436)

The present invention pertains to the Geneva or intermittent movement of motion picture apparatus and particularly to the reduction of noise in the intermittent movement.

In modern commercial motion picture machines, particularly projectors, the intermittent movement runs in a bath of oil or is drenched with oil. The cam of the Geneva movement has an arcuate portion that registers with concave faces in the star wheel for holding the wheel stationary between movements. At the end of each movement, however, an end of one of the concave faces, or a finger, strikes the arcuate cam portion with considerable force. Due to the method of lubrication described above, a film of oil is trapped in the area of the impact. I have discovered that the pounding that occurs in even an accurately machined Geneva mechanism is due to the trapped film of oil, and that the pounding can be eliminated or reduced if the oil film can be removed rapidly from the impact area.

The principal object of this invention is to reduce or eliminate pounding or oil knock and is accomplished by providing a means of rapid escape of the oil film. In the preferred construction an oil relief passage is provided in the form of a port through the arcuate cam portion or flange at the area of greatest impact. The oil relief means may however take other forms. For example, the free ends of the star wheel fingers may be relieved on the concave side to provide a clearance through which the oil film escapes.

The pounding is most severe where the arcuate cam portion is engaged by the outer ends of the star wheel fingers, since it is here that the velocity of the star wheel is greatest and the oil has the least time to escape. Accordingly, the oil relief is provided in the region where the arcuate cam portion is engaged by the outer ends of the star wheel fingers. This arrangement removes one of the serious objections to a large star wheel while retaining its principal advantage of accurate indexing within the small permissible manufacturing tolerance.

In a co-pending application Serial No. 405,775, filed August 7, 1941, I have disclosed the tapering of the free ends of the star wheels for the purpose of reducing inertia and wear. Such tapered fingers also play a part in the elimination of oil knock since they reduce the inertia of the fingers during the impact and present a reduced impacting area and hence a smaller trapped oil film.

The invention is fully disclosed by way of example in the following description and in the accompanying drawing in which:

Figure 1 is an elevation, partly in section, of the Geneva movement near the end of the motion of the star wheel;

Figure 2 is a section on the line 2—2 of Figure 1;

Figure 3 is a view, similar to Figure 1, at the end of the motion of the star wheel;

Figure 4 is an enlarged detail of Figure 3;

Figure 5 is a perspective view of the cam;

Figure 6 is a section on the line 6—6 of Figure 5, and

Figure 7 is an elevation, partly in section, of the feed sprocket shaft assembly.

Reference to these views will now be made by use of like characters which are employed to designate corresponding parts throughout.

The star wheel 1 is formed with a number of radial slots 2, and between each pair of adjacent slots is an arcuate concave face 3. As a result of this construction, each slot and the adjacent faces 3 forms a pair of fingers or prongs 4. On one side of the star wheel there is preferably formed a hub 5 for mounting on a shaft 6 which carries the usual intermittent sprocket wheel 7. A number of holes 8 are drilled through the star wheel to reduce its weight in accordance with well known practice.

An adjacent shaft 9 carries the so-called cam which includes a plate 11 carrying a pin 12 adapted to enter the slots 2. The plate also carries an arcuate flange 13 adapted to register with the face 3 of the star wheel to hold the wheel stationary between its intermittent movements or while the pin 12 is out of the slots. The locking flange 13 is relieved at 14 for about 45° to either side of the pin to permit the star wheel fingers 4 to enter, as in the well known Geneva action. Up to this point the construction is conventional.

As previously stated, this mechanism is thoroughly lubricated, and all exposed surfaces are covered with a film of oil. When the star wheel fingers approach and strike the flange 13, the trapping of the oil film between these parts results in a pounding action or knock. This is especially true of modern commercial machines where the clearance of about .0002 inch between the parts is insufficient to permit a rapid escape of the oil film.

According to the invention, a relief means is provided for rapid escape of the oil film without exceeding the above mentioned manufacturing tolerance. One form of such relief consists of a port 15 through the flange 13 at the area engaged by the approaching star wheel finger. This area is spaced from the cam pin 12, in the counter direction of cam rotation, slightly less than the distance between the outer ends of successive slots 2. A similar slot 16 is cut through the flange 13 an equal distance from the cam pin 12 in the opposite direction, for the purpose of maintaining the balance of the cam. When a star wheel finger completes its impact on the flange 13, the intervening oil film is half the usual thickness because there is no trapped film over the port 15. Also, the film on the finger may escape through the port and is not trapped between the contacting parts. The relief is completed through the opening 14 and through the open vertical side of the flange 13 as illustrated in Figures 2 and 5.

The described location of the port 15 is a matter of considered selection. It is in this area that the time permitted ordinarily for the escape of the oil film is the least, because this area is engaged by the most rapidly moving portion of the star wheel. Thus, the oil relief means is provided where the pounding would otherwise be the heaviest. It is desirable to space the relief means some distance from the portion of the flange 13 engaged by the center of the concave faces 3, in order to maintain the solid flange at this portion where the most secure locking of the star wheel between movements is obtained.

In the modification shown in Figure 4, the outer ends of the star wheel fingers are relieved about .003 inch on the concave faces by increasing the radius, as indicated by the numeral 17. This clearance provides relief of the oil film at the critical point.

In my co-pending application I have described the tapering of the star wheel fingers towards their free ends and on the lateral faces of the star wheel, as indicated by the numeral 18, for the purpose of reducing the inertia of the mechanism. This construction also contributes to the elimination of the oil knock, since it reduces the impact force and impact area.

It has been proposed to use a smaller star wheel in order to eliminate the noise in a larger mechanism. The larger mechanism, however, has the advantage of more accurate indexing and a steadier picture within given manufacturing tolerances. The present invention retains this advantage while eliminating the objection due to the oil knock. In the construction shown, the star wheel has an overall width of 1.965 inches, and the star wheel fingers overlap the ports 15 and 16 by 1/64 inch to prevent snagging of the fingers in the ports.

Although specific embodiments of the invention have been illustrated and described, it will be understood that various alterations in the details of construction may be made without departing from the scope of the invention as indicated by the appended claims.

What I claim is:

1. In an intermittent Geneva movement comprising a star wheel member having radial slots and intervening concave faces forming a finger at each side of each slot, and a cam member having a pin adapted to enter said slots and an arcuate locking flange adapted to register with said faces; said flange having an opening therethrough disposed at a distance from said pin, in the counter direction of cam rotation, slightly less than the distance between the outer ends of successive slots of said star wheel, the circumferential dimension of said opening being sufficient to relieve any oil that may be trapped between said flange and the engaging concave face, said arcuate flange having a free fluid outlet in addition to said opening, whereby said opening delivers oil away from the outer ends of said faces as they engage said opening.

2. In an intermittent Geneva movement comprising a star wheel member having radial slots and intervening concave faces forming a finger at each side of each slot, and a cam member having a pin adapted to enter said slots and an arcuate locking flange adapted to register with said faces; said flange having an opening therethrough disposed at a distance from said pin, in the counter direction of cam rotation, slightly less than, and more than half, the distance between the outer ends of successive slots of said star wheel, the circumferential dimension of said opening being sufficient to relieve any oil that may be trapped between said flange and the engaging concave face, said arcuate flange having a free fluid outlet in addition to said opening, whereby said opening delivers oil away from the outer ends of said faces as they engage said opening.

3. In an intermittent Geneva movement exposed for external lubrication and comprising a star wheel member having radial slots and intervening concave faces forming a finger at each side of each slot, and a cam member having a pin adapted to enter said slots and an arcuate locking flange adapted to register with said faces; said flange having an oil relief opening therethrough so positioned that said concave faces successively overlap said opening completely as said pin leaves the respective slots, the circumferential dimension of said opening being sufficient to relieve any oil that may be trapped between said flange and the engaging concave face.

4. In an intermittent Geneva movement comprising a star wheel member having radial slots and intervening concave faces forming a finger at each side of each slot, and a cam member having a pin adapted to enter said slots and an arcuate portion adapted to register with said faces; said fingers being relieved at their free ends by an increased radius in said concave faces at said ends, to provide a slight clearance from said arcuate portion.

5. In an intermittent Geneva movement comprising a star wheel member having radial slots and intervening concave faces forming a finger at each side of each slot, said faces being engageable by an arcuate cam member, said fingers being relieved at their free ends by an increased radius in said concave faces at said ends, to provide a slight clearance when said faces are engaged by said cam member.

KARL BRENKERT.